(12) United States Patent
West et al.

(10) Patent No.: US 11,068,067 B2
(45) Date of Patent: *Jul. 20, 2021

(54) METHODS AND SYSTEMS FOR DISPLAYING UI ELEMENTS IN MIXED REALITY ENVIRONMENTS

(71) Applicant: Unity IPR ApS, Copenhagen K (DK)

(72) Inventors: Timoni West, San Francisco, CA (US); Dylan Charles Urquidi-Maynard, San Francisco, CA (US); Amir Pascal Ebrahimi, Sausalito, CA (US); Matthew Taylor Schoen, Sausalito, CA (US)

(73) Assignee: Unity IPR ApS, Copenhagen (DK)

( * ) Notice: Subject to any disclaimer, the term of this patent is extended or adjusted under 35 U.S.C. 154(b) by 35 days.

This patent is subject to a terminal disclaimer.

(21) Appl. No.: 16/709,373

(22) Filed: Dec. 10, 2019

(65) Prior Publication Data
US 2020/0183498 A1  Jun. 11, 2020

Related U.S. Application Data

(63) Continuation of application No. 16/034,088, filed on Jul. 12, 2018, now Pat. No. 10,521,020.
(Continued)

(51) Int. Cl.
*G06F 3/01* (2006.01)
*G06T 19/00* (2011.01)
(Continued)

(52) U.S. Cl.
CPC .............. *G06F 3/017* (2013.01); *G06F 3/011* (2013.01); *G06F 3/012* (2013.01); *G06F 3/0346* (2013.01);
(Continued)

(58) Field of Classification Search
CPC ...... G06F 3/017; G06F 3/012; G06F 3/04845; G06F 3/011; G06F 3/0346; G06F 3/0482;
(Continued)

(56) References Cited

U.S. PATENT DOCUMENTS

| 10,521,020 B2 | 12/2019 | West et al. |
| 2014/0240351 A1* | 8/2014 | Scavezze .............. G06F 3/0346 345/633 |

(Continued)

OTHER PUBLICATIONS

U.S. Appl. No. 16/034,088, Notice of Allowance dated Aug. 23, 2019, 11 pgs.

*Primary Examiner* — Premal R Patel
(74) *Attorney, Agent, or Firm* — Schwegman Lundberg & Woessner, P.A.

(57) ABSTRACT

A method for improving a display of a user interface element in a mixed reality environment is disclosed. A request to display the user interface element is received. The request includes display instructions, angle threshold data, distance threshold data, and velocity threshold data. Display operations are continuously performed while sensor data is continuously received from a mixed reality user interface device. The display operations include displaying the user interface element according to the display instructions, and, based on the sensor data indicating a distance between the user interface element and the mixed reality user interface device in the mixed reality environment has exceeded a distance threshold or based on the sensor data indicating an angle of view of the mixed reality user interface device has exceeded an angle threshold with respect to the user interface element in the mixed reality environment, hiding the user interface element.

20 Claims, 16 Drawing Sheets

Related U.S. Application Data

(60) Provisional application No. 62/651,564, filed on Apr. 2, 2018, provisional application No. 62/568,475, filed on Oct. 5, 2017, provisional application No. 62/531,741, filed on Jul. 12, 2017.

(51) Int. Cl.
| | |
|---|---|
| *G06F 3/0482* | (2013.01) |
| *G06F 3/0481* | (2013.01) |
| *G06F 3/0485* | (2013.01) |
| *G06F 3/0484* | (2013.01) |
| *G06F 3/0346* | (2013.01) |
| *G06T 13/20* | (2011.01) |

(52) U.S. Cl.
CPC .......... *G06F 3/0482* (2013.01); *G06F 3/0485* (2013.01); *G06F 3/04815* (2013.01); *G06F 3/04845* (2013.01); *G06T 19/006* (2013.01); *G06T 13/20* (2013.01)

(58) Field of Classification Search
CPC . G06F 3/04815; G06F 3/0485; G06T 19/006; G06T 13/20
See application file for complete search history.

(56) References Cited

U.S. PATENT DOCUMENTS

| | | | | |
|---|---|---|---|---|
| 2014/0362195 | A1* | 12/2014 | Ng-Thow-Hing | ............................ G06K 9/00335 348/51 |
| 2018/0068474 | A1* | 3/2018 | Mowatt | ............... G06F 3/04815 |
| 2019/0018498 | A1 | 1/2019 | West et al. | |

\* cited by examiner

METHODS AND SYSTEMS FOR DISPLAYING UI ELEMENTS IN MIXED REALITY ENVIRONMENTS

CROSS REFERENCE TO RELATED APPLICATIONS

This application is a continuation of and claims the benefit of priority under 35 U.S.C. § 120 to U.S. patent application Ser. No. 16/034,088, filed on Jul. 12, 2018, which claims the benefit of U.S. Provisional Application No. 62/651,564, filed Apr. 2, 2018, entitled "Methods and systems for displaying UI elements in mixed reality environments," U.S. Provisional Application No. 62/531,741, filed Jul. 12, 2017, entitled "System and method for spatial scrolling in mixed reality environments," and U.S. Provisional Application No. 62/568,475, filed Oct. 5, 2017, entitled "Methods and systems for mixed reality displays," each of which is incorporated by reference herein in its entirety.

TECHNICAL FIELD

The present invention relates to the technical field of tools for use in crating and manipulating objects in mixed reality environments.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Throughout the description herein, the term mixed reality or mixed reality environment (MR environment) should be understood to include all combined environments in the spectrum between reality and virtual reality including virtual reality, augmented reality and augmented vitality.

A method for improving a display of a user interface element in a mixed reality environment is disclosed. A request to display the user interface element is received. The request includes display instructions, angle threshold data, distance threshold data, and velocity threshold data. Display operations are continuously performed while sensor data is continuously received from a mixed reality user interface device. The display operations include, based on the sensor data indicating that a motion of the mixed reality user interface device is below the velocity threshold, displaying the user interface element according to the display instructions, and, based on the sensor data indicating a distance between the user interface element and the mixed reality user interface device in the mixed reality environment has exceeded a distance threshold or based on the sensor data indicating an angle of view of the mixed reality user interface device has exceeded an angle threshold with respect to the user interface element in the mixed reality environment, hiding the user interface element.

The present disclosure includes apparatuses which perform the operations or methods disclosed herein, including data processing systems that perform these operations or methods and computer readable media including instructions that, when executed by one or more processors of one or more data processing systems cause the one or more data processing systems to perform these operations or methods.

Figure 1:
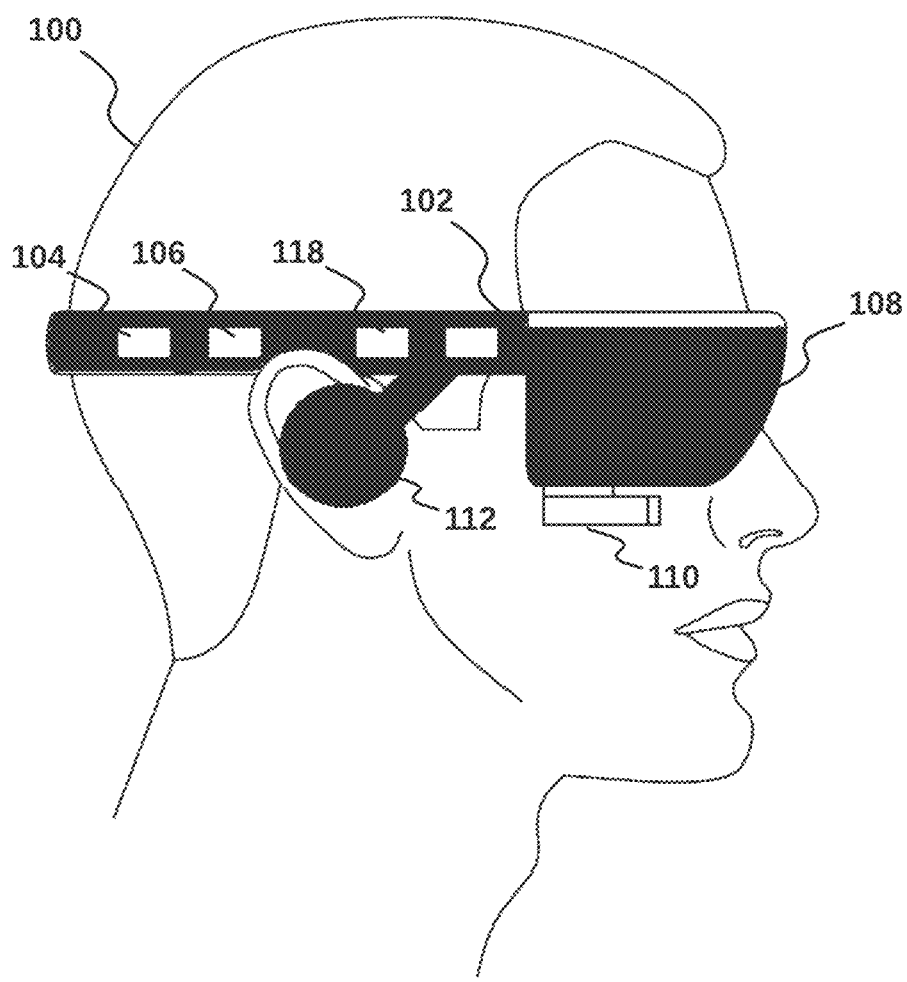
FIG. 1 is a schematic illustrating a head mounted display, in accordance with one embodiment.

FIG. 1 is a diagram of an example head-mounted display (HMD) 102, worn by a user (or "wearer") 100. In the example embodiment, the user 100 (e.g., a game developer) experiences a VR environment or augmented reality (AR) environment while wearing the HMD 102. The HMD device 102 includes a transparent or semi-transparent visor (or "lens" or "lenses") 108 through which the wearer 100 views their surroundings (also herein referred to as "the real world"). In other embodiments, the HMD device 102 may include an opaque visor 108 which may obscure the wearer 100's view of the real world and on which a complete virtual environment is displayed.

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. The display device 118 is driven or controlled by one or more graphical processing units (GPUs) 106. The GPU 106 processes aspects of graphical output that assists in speeding up rendering of output through the display device 118.

In the example embodiment, the HMD device 102 also includes a central processing unit (CPU) 104 that may execute some of the operations and methods described herein. The HMD device 102 also includes an audio device 112 (e.g., speakers) that is configured to present audio output to the wearer 100. While not separately shown, the HMD device 102 also includes wired or wireless network adapters (e.g., Wi-Fi, Bluetooth, cellular) that facilitate communication between the HMD and other computing devices described herein.

In some embodiments, the HMD device 102 includes a digital camera device 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD device 102 (e.g., similar to what the wearer 100 sees in the wearer 100's FOV when looking through the visor 108). The camera devices 110 may be configured to capture real-world digital video around the user 100 (e.g., a field of view, a peripheral view, or a 360° view around the wearer 100). The camera devices 110 may be used to capture digital video of the real real-world environment around the user 100. In some embodiments, output from the digital camera device 110 may be projected onto the visor 108 (e.g., in opaque visor embodiments), and may also include additional virtual content (e.g., added to the camera output). In some embodiments there can also be a depth camera on the HMD 102.

In some embodiments, the HMD device 102 may include one or more sensors (not separately shown), or may be coupled in wired or wireless communication with the sensors. For example, the HMD 102 may include motion or position sensors configured to determine a position or orientation of the HMD 102. In some embodiments, the HMD device 102 may include a microphone for capturing audio input (e.g., spoken vocals of the user 100).

In some embodiments, the HMD 102 may be similar to virtual reality HMDs such as the Oculus Rift™, The HTC Vive™, The Playstation VR™, and the like. In some embodiments, the HMD 102 may be similar to augmented reality HMDs such as the Microsoft Hololens™ or Meta™ HMD. In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 102 is mounted on a head of the wearer 100, and over both eyes of the wearer 100, as shown in FIG. 1. The wearer 100 may be presented with a virtual environment which may be viewed and edited via the HMD 102 and handhelds as described herein.

Figure 2:
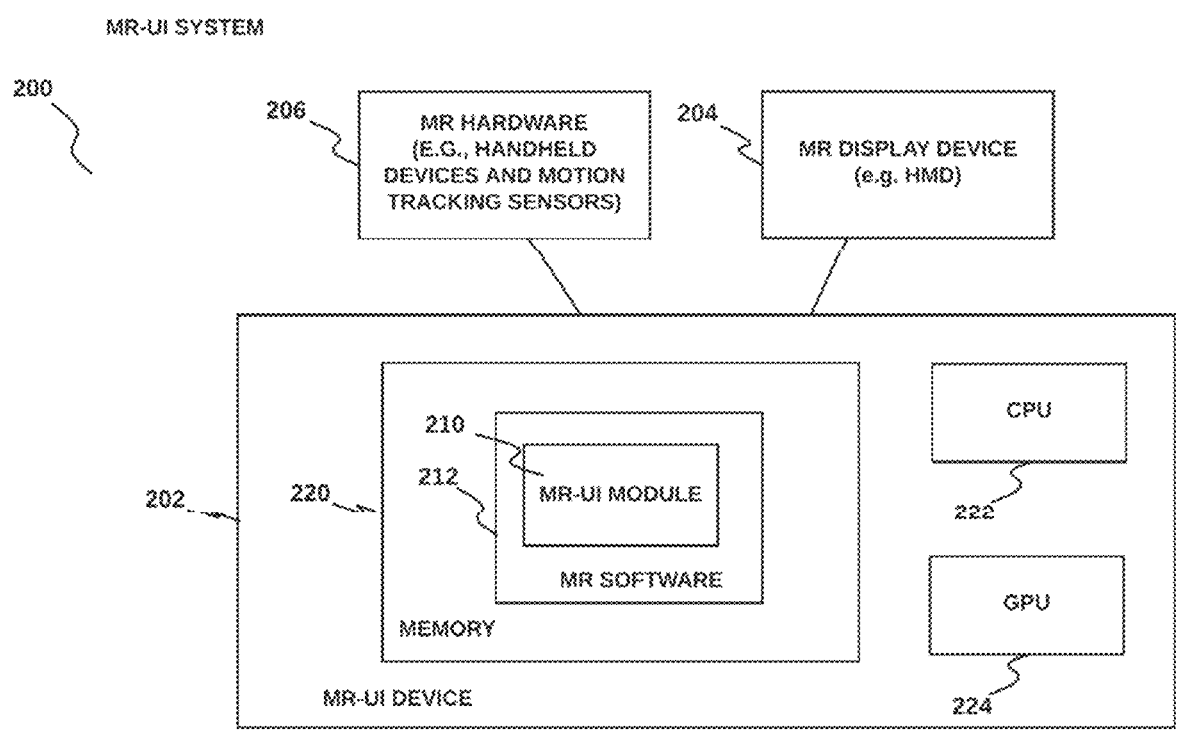
FIG. 2 is a schematic illustrating an MR-UI system, in accordance with one embodiment.

FIG. 2 is a component diagram of a Mixed reality user interface system system 200 (or MR-UI system) that includes components similar to the HMD 102 and the handhelds discussed in relation to FIG. 1. In the example embodiment, the MR-UI system 200 includes a MR-UI device 202, a MR display device 204, and one or more MR input devices 206. In some embodiments, the MR display device 204 may be similar to the visor 108, and the MR input device(s) 206 may be similar to the handhelds or other tracking devices described above in reference to FIG. 1.

In the example embodiment, the MR-UI device 202 includes a memory 220, one or more CPUs 222, and one or more GPUs 224. In some embodiments, the CPU 222 may be similar to the CPU 104, the GPU 224 may be similar to the GPU 106, and the MR-UI device 202 may be at least a part of the HMD 102. In some embodiments, the MR-UI system 200 and the various associated hardware and software components described herein may provide AR content instead of, or in addition to, VR content (e.g., in a mixed reality (MR) environment). It should be understood that the systems and methods described herein may be performed with AR content and, as such, the scope of this disclosure covers both AR and VR applications.

In the example embodiment, MR-UI device 202 includes a MR engine 212 (e.g., mixed reality software), executed by the CPU 222 and/or GPU 224, that provides a MR environment through the MR display device 204 (e.g., to the user 100). The MR engine 212 includes a MR-UI module 210 that enables various aspects of mixed reality user interface actions for the user 100 within the MR environment as described herein. Throughout the description herein, the MR environment includes a coordinate system referred to as world coordinates. The MR-UI module 210 may be implemented within, or communicate with, a larger more generic MR software application such as the MR engine 212 (e.g., a mixed reality editing application).

The MR-UI module 210 and the MR engine 212 include computer-executable instructions residing in the memory 220 that are executed by the CPU 222 and optionally with the GPU 224 during operation. The MR engine 212 communicates with the MR display device 204 (e.g., the HMD 102) and also with other MR hardware such as the MR input device(s) 206 (e.g., motion capture devices such as the handhelds), the MR-UI module 210 may be integrated directly within the MR engine 212, or may be implemented as an external piece of software (e.g., a plugin).

UI Element Display

Figure 3:
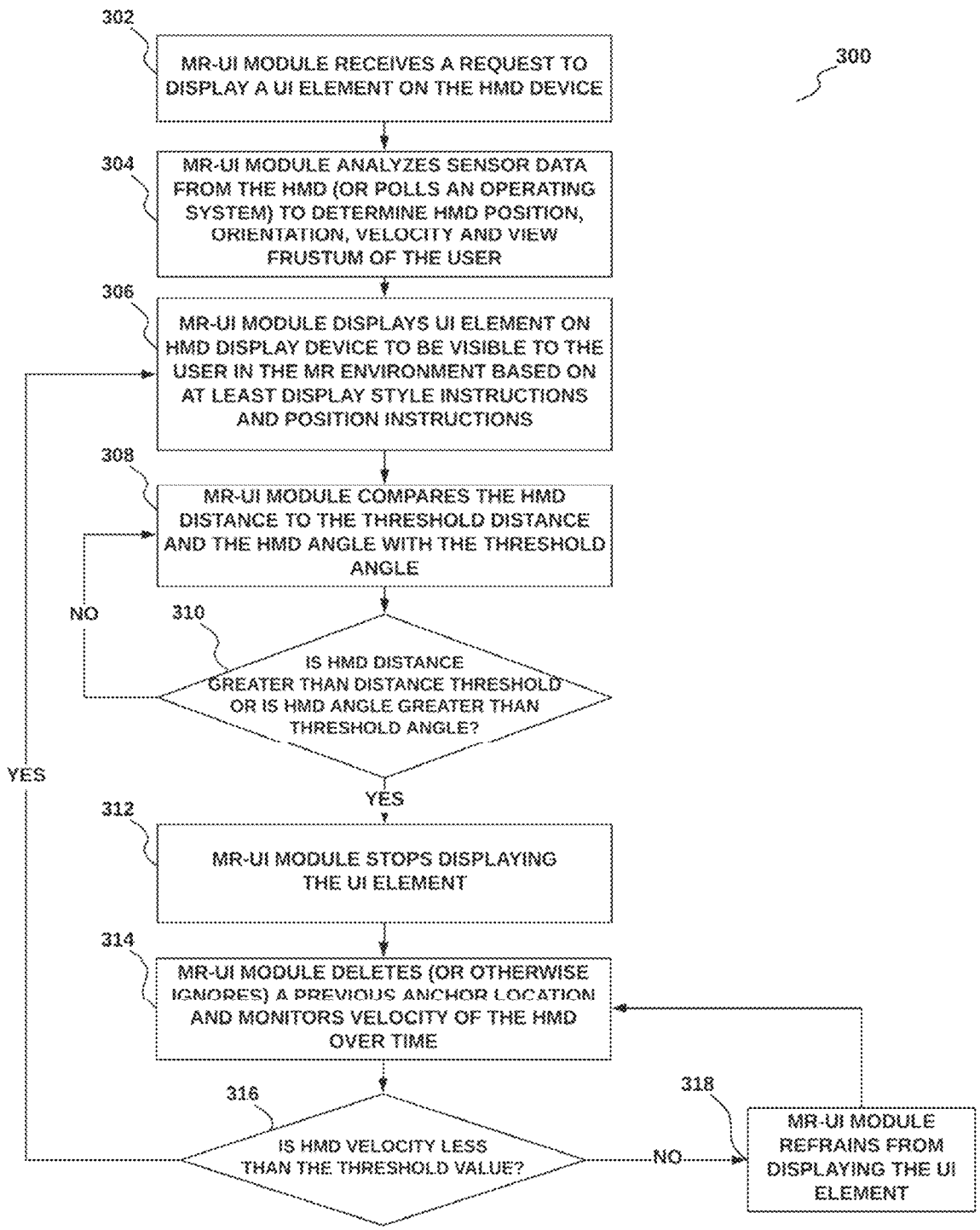
FIG. 3 is a flowchart of a method for displaying a UI element in a mixed reality environment, in accordance with an embodiment.

In accordance with an embodiment and shown in FIG. 3 is a flowchart of a method 300 for displaying a user interface element (UI element). At process 302, the MR-UI module 210 receives a request to display a UI element on the HMD device 102 and which would appear for the user to be in the MR environment. The request can be triggered by a user action including actions such as pressing a button and using a pointer. The UI element can be any single or grouped UI element, including linear menus, circular menus, interactive gizmos and the like. In accordance with an embodiment, the UI element is a 3D virtual object. In accordance with an embodiment, the UI element is an input element that can take input (e.g., menu item selections or the like) from the user based on the hand movement and position of the user (e.g. via the spatial scrolling method described herein). The request can include display style instructions for displaying the UI element, 3D virtual object data (object shape data, texture data, and the like), content data for the display of the UI element, positioning instructions for the UI element, threshold data for the UI element, and morphing instructions for the UI element. In accordance with an embodiment the positioning instructions include instructions on how to position the UI element in world coordinates (e.g., coordinates for an anchor of the UI element object) with respect to the HMD when the UI element is first displayed. This might include instructions on positioning the anchor with respect to the field of view of the user (e.g. place the UI element at the center of the field of view and at a distance of 10 distance units from the HMD) and instructions on the distance and direction of the UI element with respect to the HMD position and orientation (e.g., position the UI element at a specific distance from the HMD and at specific angles from the HMD gaze angle). In accordance with an embodiment, the threshold data includes a distance threshold, an angle threshold, and a velocity threshold. The distance threshold is a value that defines a threshold distance between the UI element and the HMD location (e.g., from the center point of the HMD object to the center point of the UI element object). In accordance with an embodiment, a HMD angle is an angle between two directions, e.g. using a dot product calculation. The first direction may be the direction of the gaze of the HMD or the direction of the gaze of the user (e.g., if the HMD is capable of tracking the gaze of a user). The second direction may be the direction from the HMD (e.g., the center of the HMD) to the UI element (e.g., center of the UI element). The angle threshold is a value that describes a threshold value for the HMD angle. The velocity threshold is a threshold value for the velocity of HMD motion (e.g., due to user head motion). At process 304, the MR-UI module 210 analyzes the sensor data from the HMD 102 and hand-held device information to determine the HMD position, HMD orientation (or their gaze location via eye tracking), and HMD velocity. The MR-UI module 210 determines the field of view of the user. Process 304 can also include sending a request to the operating system of the HMD for the position, orientation and velocity of the HMD. Process 304 can also include using image data from a HMD camera 110 to determine HMD position, orientation and velocity by using image processing techniques. Process 304 continues throughout the entire method 300 in an ongoing basis (e.g., the MR-UI module 210 is continuously determining the position of the HMD and the field of view of the user, such as once per displayed frame). At process 306, the MR-UI module 210 displays the UI element on the HDM device so as to be visible to the user in the MR environment. In accordance with some embodiments, the MR-UI module 210 displays the UI element based on the HMD velocity being less than the velocity threshold (e.g., to ensure the head of the user is steady). The MR-UI module 210 displays the UI element based on at least the display style instructions and the position instructions. The MR-UI module 210 displays the UI element in a fixed location with respect to the MR environment (e.g. the UI element is anchored in the coordinate system of the MR environment such that the anchored position of the UI element is independent of the motion of the HMD). At process 308, the MR-UI module 210 determines the distance between the 3D position of the UI element and the 3D position of the HMD in world coordinates to determine a HMD distance (e.g., by determining the L2 norm distance between the UI element position and the HMD position). The MR-UI module 210 compares the HMD distance to the distance threshold. Also during process 308, the MR-UI module 210 compares the HMD angle with the threshold angle. At process 310, based on the HMD distance being less than the distance threshold, and the HMD angle being less than the angle threshold, the MR-UI module 210 continues to display the UI element in the anchored position in world coordinates (e.g., and continues with process 306 and 308). Based on the HMD angle being more than the threshold angle, or the HMD distance being more than the threshold distance, at process 312, the MR-UI module 210 stops displaying the UI element (e.g., fades the UI element out, wherein the fade includes a visual transition that would be aesthetically applicable to the UI contents in the UI element). At process 314, based on the UI element no longer being displayed, the MR-UI module 210 deletes (or otherwise ignores) the previous anchor location for the UI element and monitors the velocity of the HMD over time (e.g., using the HMD sensor data or requesting the velocity from the HMD operating system or using image analysis techniques on HMD camera 110 data). At process 316, the MR-UI module 210 compares the velocity of the HMD with the velocity threshold, and based on the HMD having a velocity above the threshold velocity, the MR-UI module 210 refrains from displaying the UI element (process 318) and continues to monitor the HMD velocity (e.g., at process 314). Based on the HMD having a velocity below the threshold velocity, the MR-UI module 210 uses the positioning instructions and a current HMD position, orientation and view frustum (e.g., from process 304) to choose a new anchor position and display the UI element at that anchor position (e.g., by returning to process 306). In example embodiments, the fading out of the UI element or the refraining from displaying the UI element allows the user improved navigation in the mixed-reality environment (e.g., when the UI element is a configurable distance from the user's center of view, any obstruction that may be caused by the full display of the UI element may be reduced or eliminated). In example embodiments, the user doesn't have to move the UI element (e.g., a menu) manually (or re-open it) if they move their heads. Instead, once the user's head slows down in a new location, the UI element pops up or reappears in the same spot within the user's field of view without the user having to do anything (in contrast to a persistent menu that is always visible and follows the user's head at every move, which may be visually tiring or distracting). In example embodiments, system performance may be improved by, for example, the deletion of the anchor location (e.g., because memory is freed up for other uses) or the fading out of or the refraining from displaying of the UI element (e.g., because less processing power is needed for rendering of UI elements in the mixed reality environment).

Figure 4A:
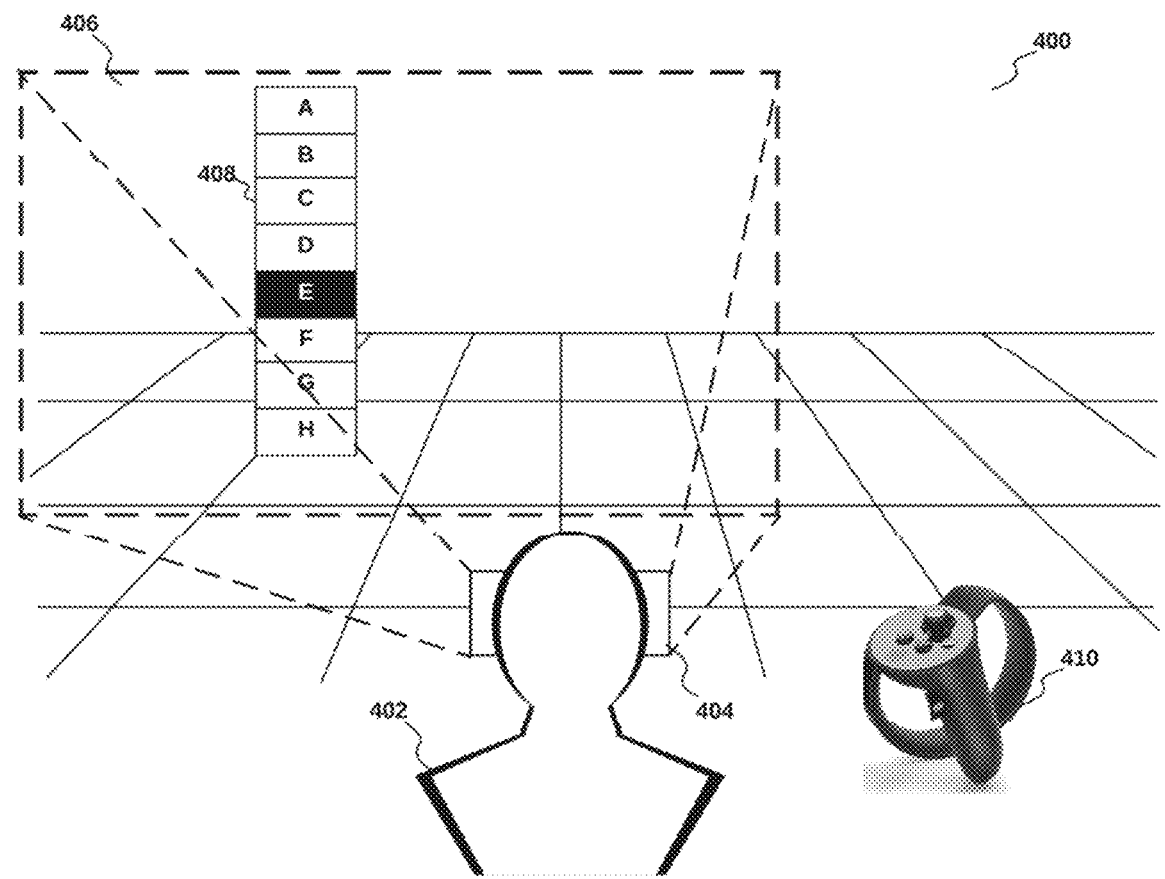
FIGS. 4A, 4B and 4C are illustrations of a MR-UI system displaying a UI element, in accordance with an embodiment.
Figure 4B:
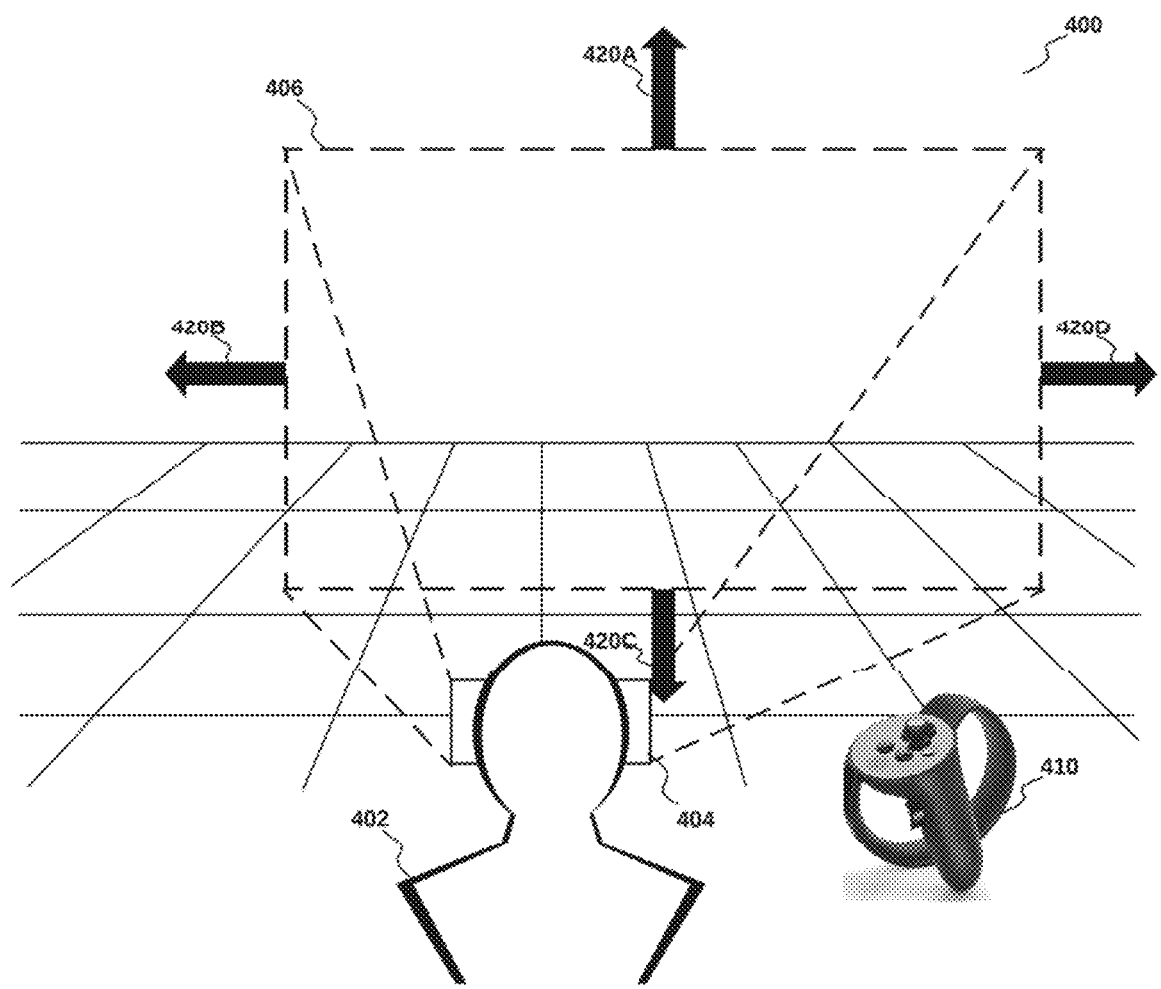
Figure 4C:
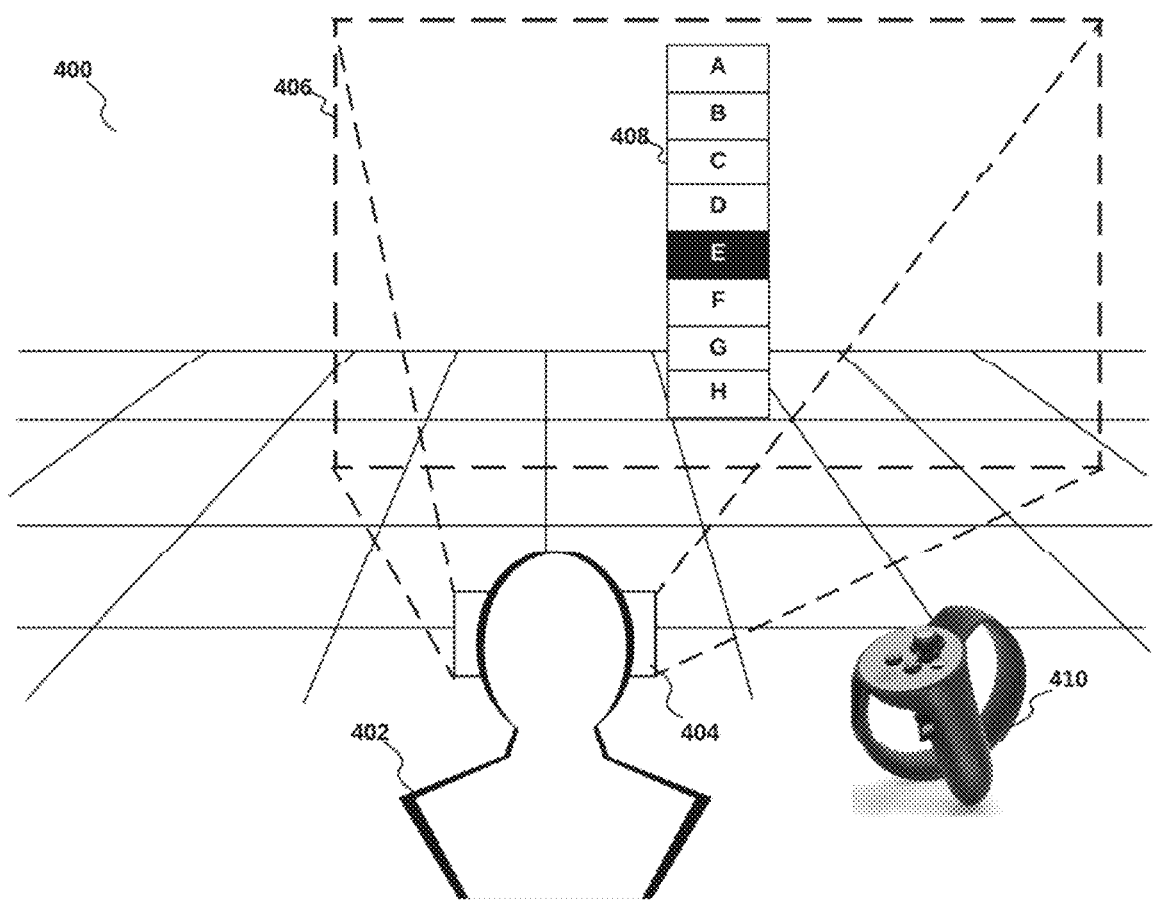

An example of the method 300 outlined in the flowchart within FIG. 3 is shown in FIG. 4A, FIG. 4B and FIG. 4C. FIG. 4A, FIG. 4B and FIG. 4C show a 3rd person point of view of a MR environment 400 that includes an avatar 402 of a user, a virtual object representing a HMD 404, a virtual object 410 of a handheld device, a view frustum 406 for the HMD 404, and a UI element 408. In this example, the UI element 408 is a 3D menu object. The avatar 402 of the user, the HMD 404, and the handheld device 410 objects are shown for ease of discussion and do not need to be shown during operation. The view frustum 406 represents the field of view for a user wearing an HMD. In accordance with an embodiment, FIG. 4A shows the method 300 outlined in FIG. 3 at a point during process 306 and 308 whereby the user has anchored the UI element 408 at a location in the MR environment 400 within the field of view frustum 406. As long as the movement of the HMD 404 keeps the UI element 408 within the distance threshold and the angle threshold (e.g., typically chosen to keep the UI element within the field of view frustum), the MR-UI module 210 continues to display the UI element 408 at the anchored location within the view frustum 406 even though the head of the user (and the HMD) are moving. In accordance with an embodiment, FIG. 4B shows the method 300 outlined in FIG. 3 at a point during process 312 and 314 whereby the user has moved the HMD beyond the distance threshold or the angle threshold and the MR-UI module 201 has stopped displaying the UI element 408 in the view frustum 406 (e.g., by fading it away). The MR-UI module 210 monitors the velocity of the HMD, and does not display the UI element 408 as long as the velocity of the HMD remains above the velocity threshold. The four arrows in the FIG. 4B (420A, 420B, 420C and 420D) are shown to represent the movement of the view frustum 406 due to movement of the HMD whereby the movement can be angular or translational. The UI element 408 will not be displayed even if the view frustum 406 passes back over the initial UI element anchor position (as shown in FIG. 4A) as long as the HMD velocity is above the threshold velocity. In accordance with an embodiment, FIG. 4C shows the method 300 outlined in FIG. 3 at a point during process 306 after process 316 has determined that the HMD velocity is less than the threshold velocity, whereby the user has slowed (or stopped) the HMD movement below the threshold velocity and the UI element 408 is anchored (e.g., by the MR-UI module 210) to a new location and displayed again in the view frustum to the user.

UI Element Morphing

In accordance with an embodiment, as part of process 304, the MR-UI module 210 determines whether the hand of the user is within the view frustum 406. At process 306, based on the hand being within the view frustum 406, the MR-UI module 210 displays the UI element 408 as if attached to a user's hand (e.g. virtual hand in the virtual reality environment 400, and real hand in augmented reality environment 400) or attached to a handheld device (e.g., virtual handheld device in virtual reality environment 400, and real handheld device in augmented reality environment 400) instead of displaying the UI element in an anchored position in world space. In accordance with the embodiment, while the hand of the user is within the view frustum 406 of the HMD, the UI element 408 remains displayed anchored to the hand of the user (e.g., moves with the hand of the user). The hand of the user can be tracked by tracking the handheld device 206 or by analyzing the video from the HMD camera and using object recognition methods. The MR-UI module 210 re-displays the UI element 408 anchored in world space based on the hand of the user not being in the view frustum 406 and the HMD velocity being lower than the threshold velocity.

Figure 5A:
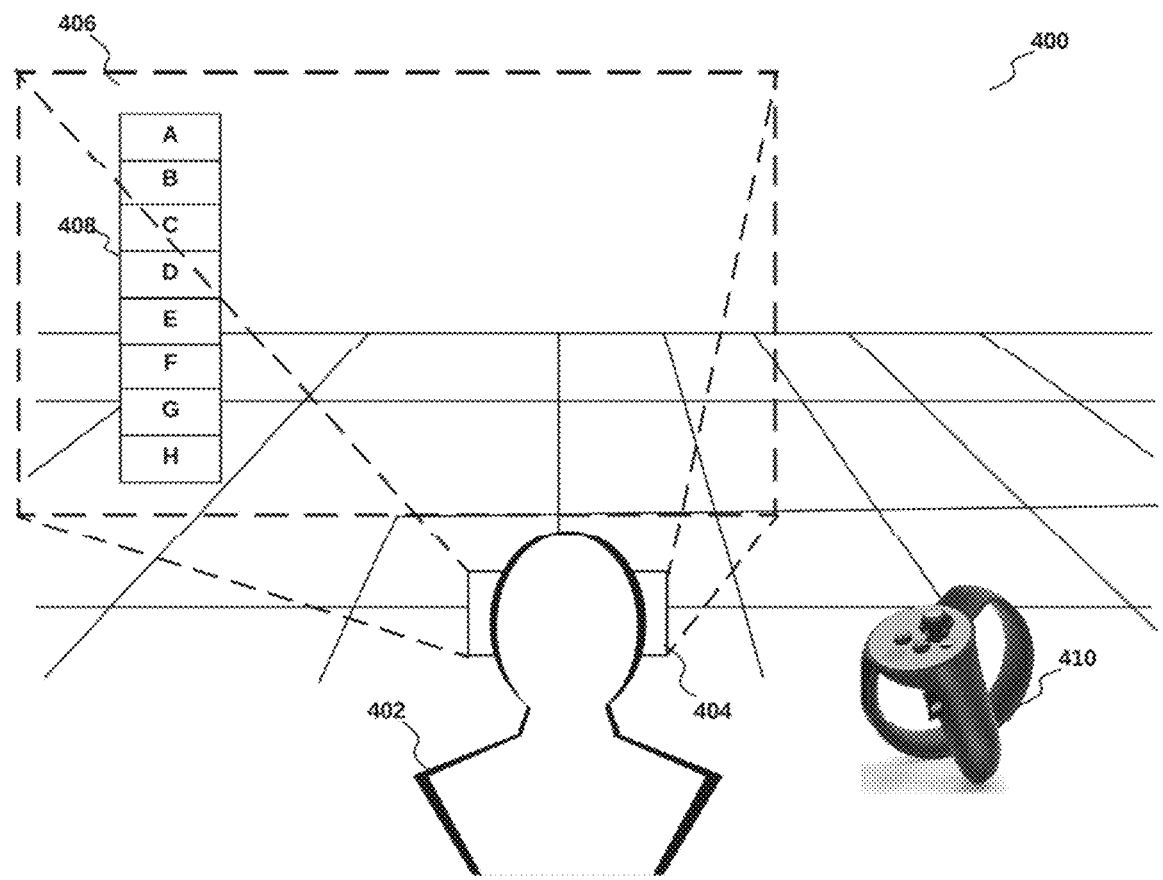
FIGS. 5A, 5B and 5C are illustrations of a MR-UI system morphing a UI element, in accordance with an embodiment.
Figure 5B:
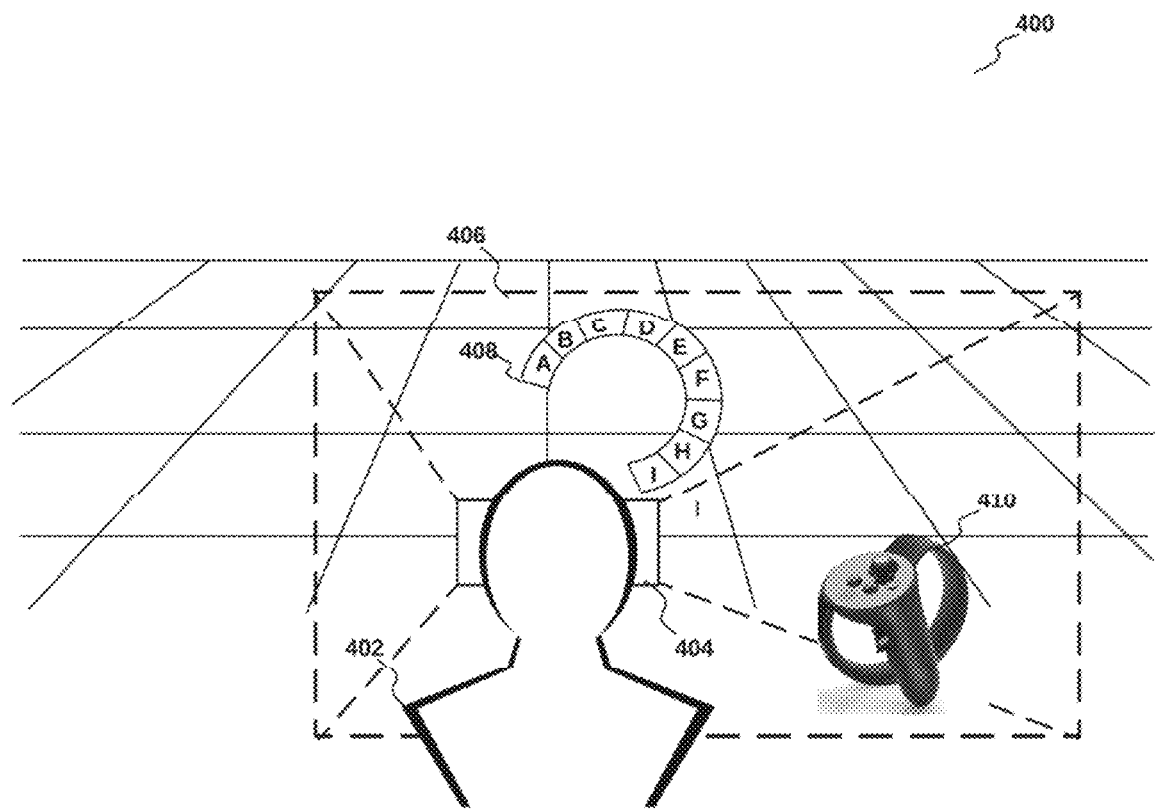
Figure 5C:
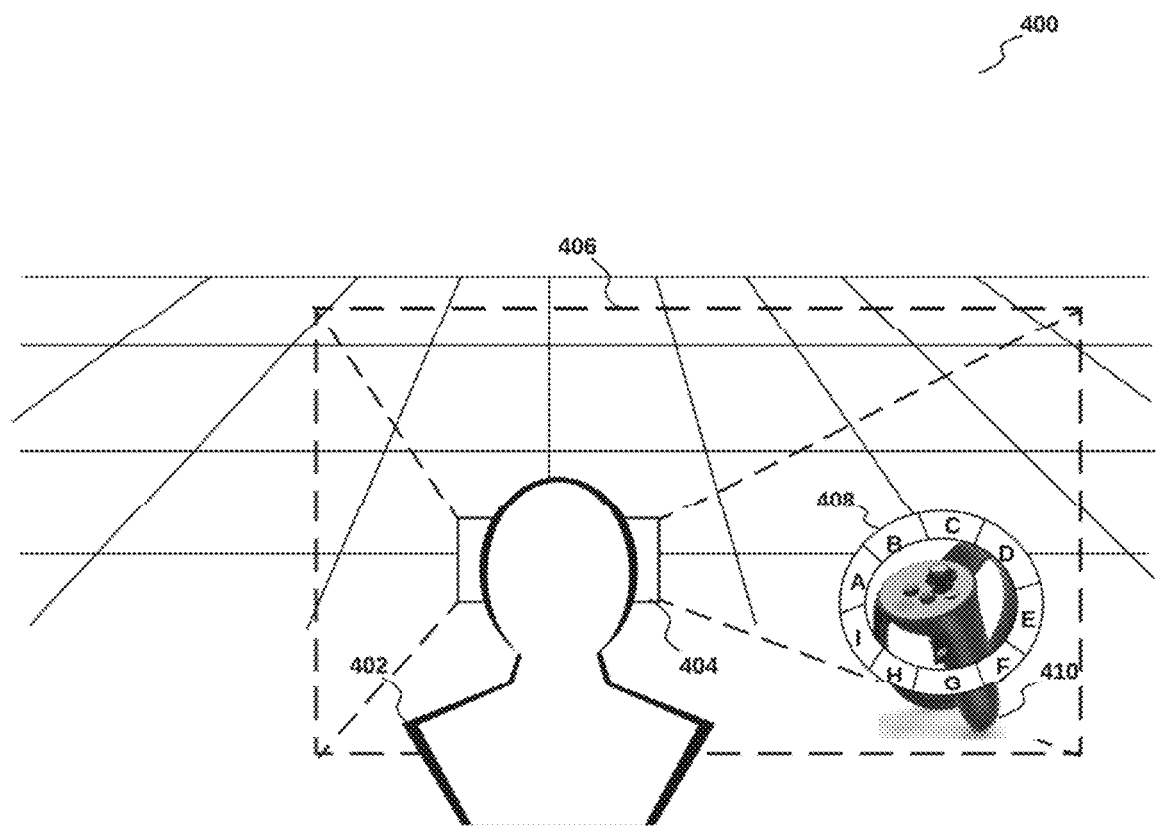

In accordance with an embodiment, FIG. 5A, FIG. 5B and FIG. 5C show a 3rd person point of view of a MR environment 400 that includes an avatar 402 of a user, a virtual object representing a HMD 404, a virtual object 410 of a handheld device (e.g., representing a hand position for the user), a view frustum 406, and a UI element 408. In accordance with an embodiment and shown in FIG. 5A, FIG. 5B and FIG. 5C, is an example of how the UI element 408 can transition from being anchored in real world coordinates (e.g., shown in FIG. 5A) to being anchored on the hand of the user (e.g., shown in FIG. 5C). For example, the UI element 408 can morph (e.g., deform itself according to the morphing instructions) in order to transition in a visually aesthetic way from being anchored in world space to being anchored to the hand of the user. FIG. 5A shows the UI element 408 before the transition, whereby the UI element 408 is anchored in world space and has a rectangular shape (e.g., in accordance with the display style instructions related to the anchored position for the UI element). FIG. 5B shows a moment wherein the frustum 406 includes the virtual object 410 representing the hand of the user and wherein the UI element 408 is in transition between being anchored in world space (e.g., as shown in FIG. 5A) and anchored to the hand of the user (e.g., as shown in FIG. 5C), whereby the UI element 408 is deformed (e.g., taking a curved shape similar to the letter 'c'). FIG. 5C shows the UI element 408 after the transition, whereby the UI element 408 is anchored to the hand of the user (or handheld device 410) and has a doughnut shape (e.g., in accordance with the display style instructions related to the anchored position for the UI element). While the example shown in FIGS. 5A, 5B and 5C show discrete points in the transition, the UI element 408 transitions from a rectangular shape (shown in FIG. 5A) to a doughnut shape (shown in FIG. 5C) with the transition morphing happening in a continuous way (e.g., as in an animation defined within the morphing instructions).

Spatial Scrolling

In accordance with an embodiment, the MR-UI module 210 includes a spatial scrolling method that when executed, allows the user 100 to scroll through menus within the MR environment, as described herein. During operation, in an example embodiment, the MR-UI module 210 tracks the position of one or both hands of the user 100. In some embodiments, the MR-UI module 210 analyzes motion of a single hand of the user 100 to perform scrolling actions for a menu. In some embodiments, the MR-UI module 210 monitors the motion of both hands and each hand can perform the spatial scrolling motion independently, thereby causing the MR-UI module 210 to scroll through two menus independently. For example, the right hand may scroll through a first menu, while the left hand is scrolling through a second menu.

Figure 6:
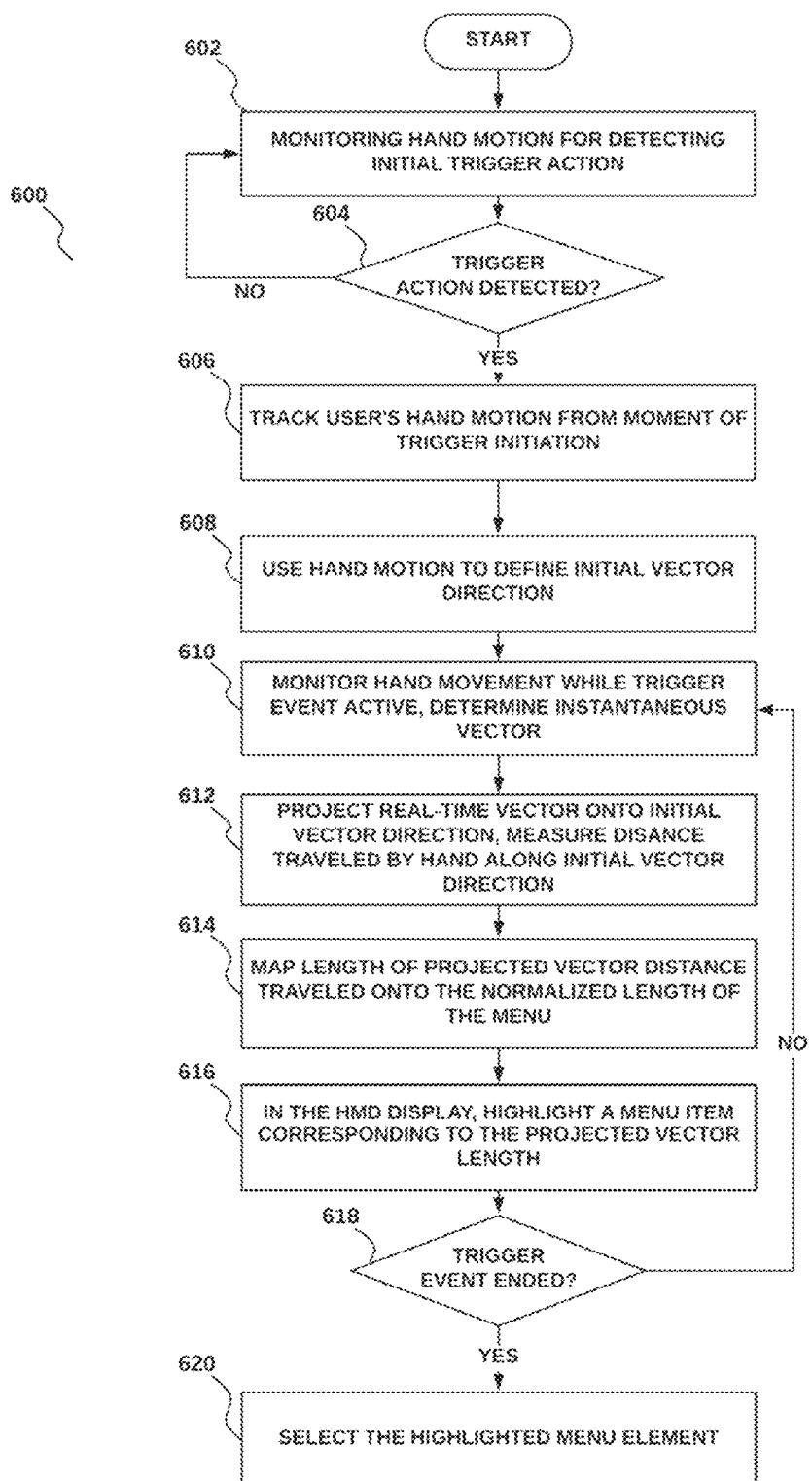
FIG. 6 is a flowchart of a method of spatial scrolling performed by the MR-UI module using the HMD, in accordance with an embodiment.

FIG. 6 is a flowchart of a method 600 of spatial scrolling performed by the MR-UI module 210 using the HMD 102. In an example embodiment, prior to operation, a trigger action is defined which the MR-UI module 210 uses as a signal to determine when a scrolling event is being initiated. The trigger action may be, for example, a specific movement of the hand (e.g., a small circular motion), or a specific movement of the fingers (e.g., pinching, finger pointing down), or a specific input from a handheld device (e.g., pressing and holding a button).

During operation, and in accordance with one embodiment, the MR-UI module 210 monitors hand motion of the user to determine when the trigger event has been initiated based on the trigger action definition (see operation 602). For example, if the trigger action is defined by a specific input from a handheld device (e.g. pressing and holding button), then the MR-UI module 210 monitors the inputs from the handheld device in order to detect occurrence of the trigger gesture. If the trigger action is defined by the specific actions of the fingers (e.g. pinching of the thumb and index fingers), then the MR-UI module 210 tracks the motion of the user's fingers to detect the trigger gesture. If the trigger action is defined by the specific motion of a hand, then the MR-UI module 210 monitors the motion of the user's hand.

One of the benefits of the method described herein is the fact that it is compatible with a system that does not have buttons on a handheld device.

In the example embodiment, when the MR-UI module 210 detects the trigger action (see test 604), the MR-UI module 210 begins the spatial scrolling process, tracking the motion of the hand that initiated the trigger (see operation 606). The user is free to move their hand through space in any direction of their choosing after performing the trigger action, and this initial motion defines the initial vector direction in which the action of scrolling will be measured.

The spatial scrolling process, in one example embodiment, can be thought of as a user dropping a "pin" in 3D space and time when the trigger is set, then dragging their hand away from that pin while still performing the trigger action (e.g., while still holding a button). One of the benefits of this method is the fact that depth (e.g., distance towards and away from the user) can be used to scroll and select menu items in AR or VR environments. The initial vector direction is defined by first creating an origin in 3D space at the position where the trigger action first occurred and detecting the initial direction of the hand (or input device) movement with respect to that origin over a short time or distance (see operation 608). The initial movement (e.g., over the short time or distance) defines an initial vector with direction and magnitude.

After the initial vector direction is defined, in the example embodiment, the MR-UI module 210 defines the instantaneous vector direction by monitoring the hand movement over time (e.g., while the trigger event is still being pressed) and creating a vector from the origin to the instantaneous position of the hand as the hand moves through space (see operation 610). The instantaneous vector is projected mathematically (e.g., via vector projection) along the initial vector (see operation 612), allowing the user to be free from needing to carefully keep their hand aligned with the initial vector direction. The magnitude (e.g., length) of the projected vector is calculated (see operation 612) and used to scroll through a list of menu items by mapping the length of the projected vector onto the length of the menu (see operations 614, 616). The user has the freedom to move their hand anywhere in space, but only the amount of their hand's current position vector, when projected upon the initial direction vector, counts towards the "scrolling" amount. When the trigger event ends (e.g., the hand ends the pinching gesture, or the user stops pressing the button) (see test 618), the module selects the menu item which is highlighted (see operation 620).

In some embodiments, the length of the projected vector (and therefore the distance travelled) can be quantized, according to the number of items in the collection that will be scrolled through. A maximum repeating scroll distance (e.g., magnitude) can be applied, allowing for continuous cycling through menu items when the user hand moves in a single direction. This quantized approach allows for incremental stepping through items in a menu according to their quantized position on the maximum normalized distance defined in the implementation. The length of the initial vector may be normalized, and given the number of options in the menu, the MR-UI module 210 may cycle through the menu elements proportionally, according to how much of the projected vector overlaps with the normalized initial vector. The module may then update the display of the menu in the HMD display by highlighting the menu item that corresponded to the length of the projected vector. This results in the continuous looping through items in a collection or menu according to the length of projected vector, repeating/cycling each time the projected vector length goes beyond a multiple of the normalized initial vector length.

Figure 7:
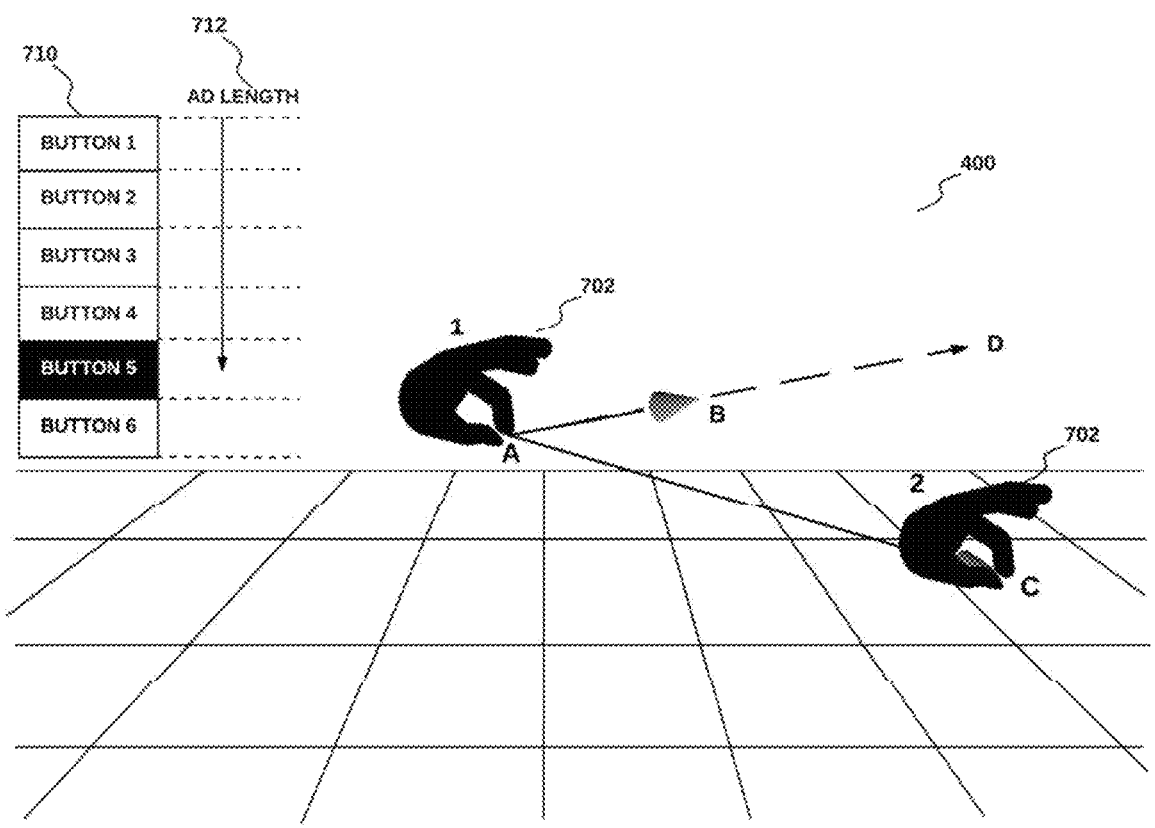
FIG. 7 illustrates an example view of a virtual environment from the perspective of a user wearing the HMD, in accordance with an embodiment.

FIG. 7 illustrates an example view of a virtual environment 400 from the perspective of a user wearing the HMD 102. For simplicity the environment shown is a virtual reality environment. In the example embodiment, a disembodied hand 702 represents the position of a user's hand as seen through the HMD 102. The hand 702 is shown in two positions, a first position labeled (1) where the user starts the spatial scrolling movement by performing the trigger action, and a second position labeled (2) at a later time during the spatial scrolling movement. In the example shown, the trigger action is a pinching gesture of the user's index finger and thumb.

In the example embodiment, from the first position (1), the module defines an origin labeled 'A', which represents the position of the tips of the fingers that perform the pinch at the moment the trigger was initiated. In some embodiments, the exact position of 'A' with respect to the hand can be different for each tracking event (e.g., where the same relative position is tracked through the event). For example, the MR-UI module 210 may track the position of the tips of the fingers in the pinch, or a knuckle close to the pinch, or any well defined point somewhere on or near the user's hand or on the handheld device.

The MR-UI module 210, in the example embodiment, tracks the pinching location of the fingers over a short time or distance to define the initial vector which in FIG. 7 is labeled 'AB'. The MR-UI module 210 calculates a first vector, shown in the figure as vector AB, which represents the direction of the initial vector. The MR-UI module 210 continues to monitor the position of the hand to define a second vector (AC) that represents the instantaneous vector direction at the moment of the later time at position (2). The path of the user hand between point A and point C can take any shaped route (e.g., there is no requirement for the path to be straight). The MR-UI module 210 then takes the instantaneous vector AC and projects it (e.g., using a dot product) along the initial vector AB to create the projected vector AD. The length of the projected vector AD is calculated and the length of vector AD is mapped onto the length of a displayed menu 710 in order to identify and highlight one of the menu items (e.g., buttons 1-6) of the menu 710.

In the example embodiment, prior to operation, a location on the menu 710 is defined as the origin and the length of the menu 710 is determined. The length of the menu can be determined dynamically during operation if items are added to the menu. During operation, the length of the projected vector AD is compared with the length of the menu 710 in order to determine the menu item that the MR-UI module 210 should highlight. The mapping of the projected vector AD length to the menu length is shown in more detail in the description for FIG. 8A below.

Continuing with the example, FIG. 7 shows the menu 710 floating in the 3D environment 400 along with a visual representation of the length of the vector AD 712 compared to the menu length. In the example shown, the vector length of AD when compared to the length of the menu would cause the module to highlight 'Button 5' on the menu. While the vectors (AB, AC, and AD) and the vector length of AD 712 are shown in the figure, they are shown only to clarify the description of the method and, in the example embodiment, would not be seen in a real implementation of the spatial scrolling method 600. For example, the user might see their hand move from position (1) (e.g., point A) to position (2) (e.g., point C) and they would see the menu 'Button 5' highlighted when the hand reached position (2).

Button 1 through to Button 5 would each be highlighted in turn as the hand 702 moved from position (1) to position (2) and the length of the projected vector AD was mapped onto the menu items.

Figure 8A:
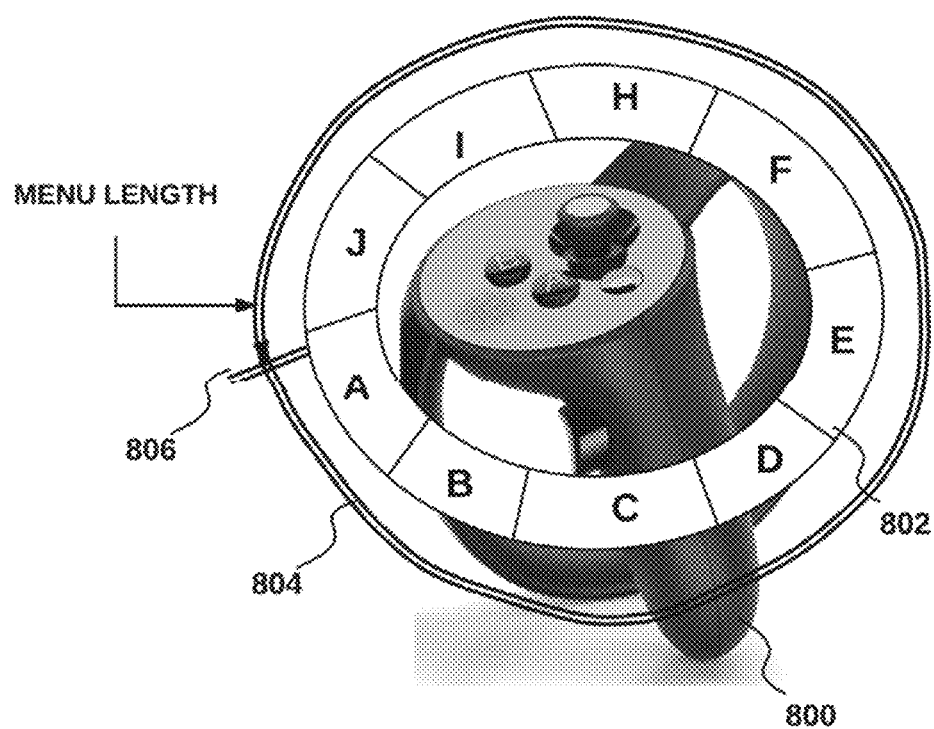
FIG. 8A is a schematic of a handheld device with a circular menu displayed around the top of the device (e.g., as might be seen through the HMD in an MR environment), in accordance with an embodiment.

FIG. 8A is a schematic of a handheld device 800 with a circular menu 802 displayed around the top of the device (e.g., as might be seen through the HMD 102 in an MR environment). The handheld device 800 can be similar to the handheld devices 206 described with respect to FIG. 2. In the example shown, the menu 802 has items illustrated generically by the letters A through J. Along with the menu 802 is shown a circular line 804 (e.g., which would not be visible to a user) that illustrates one example embodiment for how the menu items could be mapped to a linear length. The origin 806 of the menu 802 is shown in FIG. 8A as the beginning of the menu item A. The line 804 is shown separate from the menu for ease of explanation, but for an accurate mapping of the menu length the line mapping the menu length would run directly over the menu items.

Figure 8B:
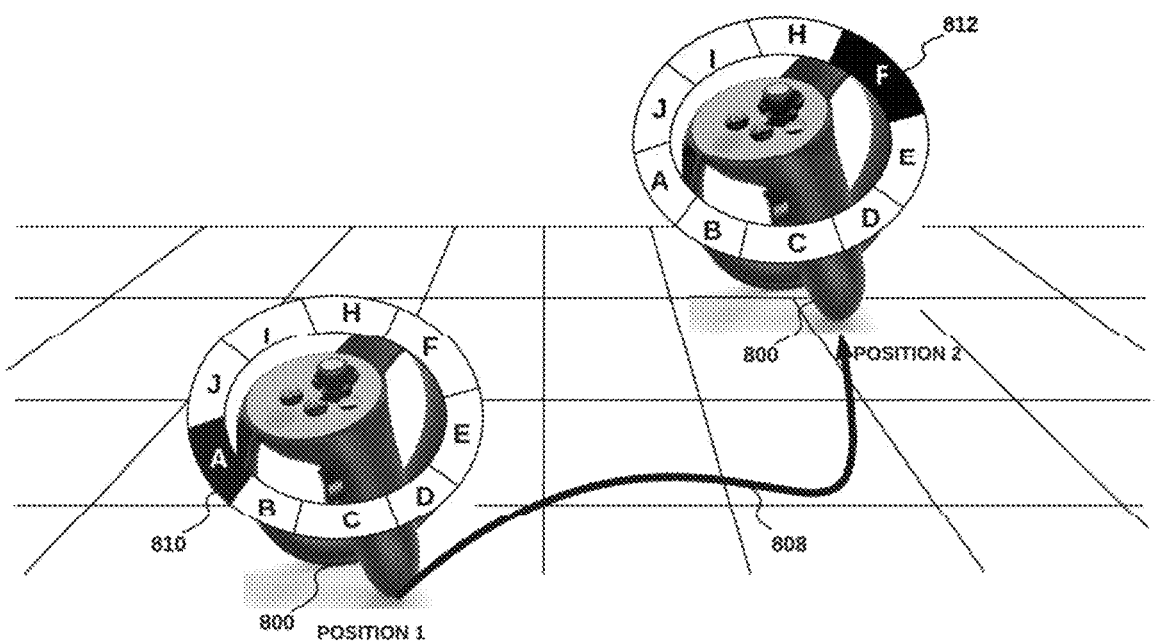
FIG. 8B is an example of the spatial scrolling with the handheld device shown in FIG. 8A, in accordance with an embodiment.

In accordance with an embodiment, FIG. 8B is an example of spatial scrolling with the handheld device shown in FIG. 8A. In the example, the handheld device is moved from position 1 (e.g. where the trigger is first activated) to position 2 along a winding path 808 while the trigger action is activated throughout. The highlighted menu starts with item 'A' 810 being highlighted when the trigger is first activated at position 1 (e.g., since menu item 'A' is defined as the origin 806 for the example menu 802 shown in FIG. 8A). The path 808 is analyzed as described above in order to determine the initial vector, instantaneous vector, and projected vector. The length of the projected vector is used to map the path taken to the length of the menu. In some embodiments, at each point on the path 808, the instantaneous vector is projected along the initial vector to create the projected vector. In the example shown in FIG. 8B, the path 808 leads the MR-UI module 210 to highlight menu item 'F' 812 at position 2. The highlighted items can wrap around (e.g., go from A to J and then start back at A) if, for example, the path is long enough that the projected vector length is longer than the determined menu length 804. Further, the projected vector length may be scaled with respect to the actual menu length in order to speed up (or slow down) the scrolling of the highlighted menu item with respect to the motion of the user's hand.

Figure 9:
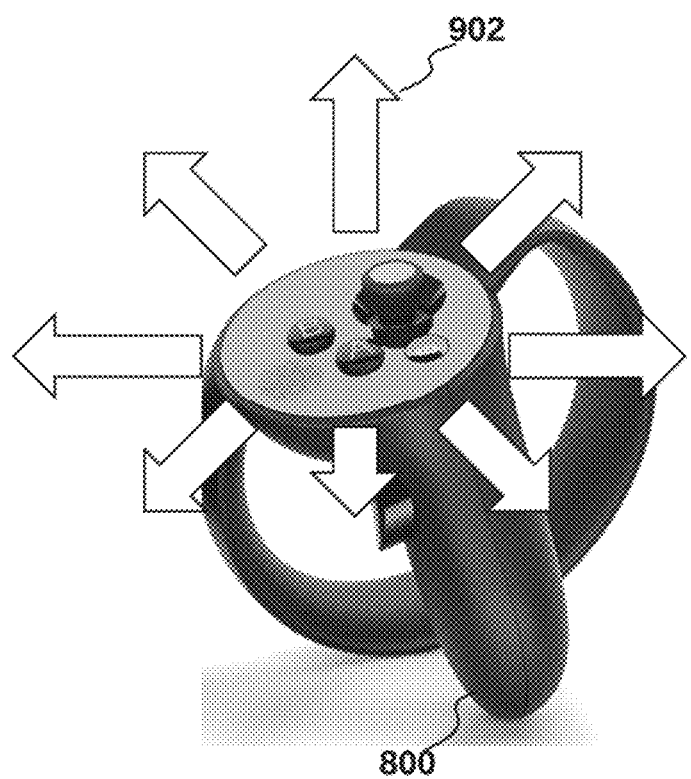
FIG. 9 is a schematic illustrating an example embodiment in which the MR-UI module displays icons around the user's hand after the hand has performed a trigger action.

FIG. 9 illustrates an example embodiment in which the MR-UI module 210 displays icons around the user's hand after the hand has performed a trigger action. In the example embodiment, the user's hand is represented by the handheld 800, and the icons are arrows 902. In other embodiments, the icons may be more specific image icons that represent, for example, tools, options, or modes. The icons are anchored in the environment coordinates, allowing the user to drag their hand/device "into" the icons.

In the example embodiment, the MR-UI module 210 compares the initial vector direction with a predefined direction vector that represents an icon (e.g., each icon would have a defined vector direction from the origin of the handheld device 800). If the initial vector direction is close to the predefined vector (e.g., within a threshold value), then the MR-UI module 210 performs the scrolling method 600 for specific content associated with the predefined vector direction. For example, if the user moves their hand to the left and creates a leftward pointing initial vector, they could cycle through a first collection of items. As the user drags their hand (e.g., performing the trigger action) towards an icon (e.g., after passing a pre-defined threshold), the MR-UI module 210 may highlight the icon or perform a visual change on the icon including, for example, scaling, fading, chromatic change, and may show a tooltip displaying details about the icon options. When the user drags "into" the icon and releases the trigger (e.g., releases the button), the module may then select the option/menu associated with the highlighted icon. At a later time, the user can create a second initial vector in another direction (e.g., upward, rightward, downward), causing the MR-UI module 210 to cycle through a second collection of menu items.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-9 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 10:
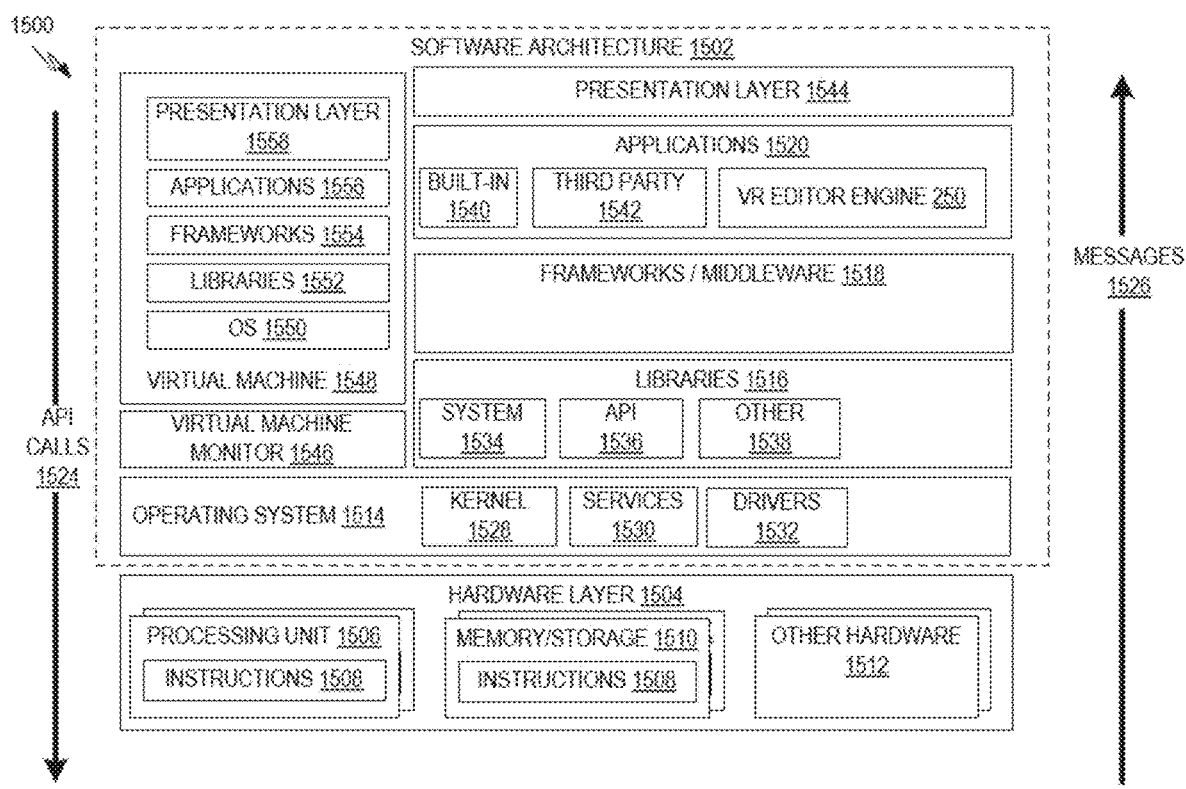
FIG. 10 is a block diagram illustrating an example software architecture, which may be used in conjunction with various hardware architectures herein described (e.g., to provide a gaming engine and/or components of the MR-UI system herein described)

FIG. 10 is a block diagram 1500 illustrating a representative software architecture 1502, which may be used in conjunction with various hardware architectures described herein to provide the MR tools described herein. FIG. 10 is merely a non-limiting example of a software architecture and it will be appreciated that many other architectures may be implemented to facilitate the functionality described herein. The software architecture 1502 may be executing on hardware such as machine 1600 of FIG. 11 that includes, among other things, processors 1610, memory 1630, and I/O components 1650. A representative hardware layer 1504 is illustrated and can represent, for example, the machine 1600 of FIG. 11. The representative hardware layer 1504 comprises one or more processing units 1506 having associated executable instructions 1508. Executable instructions 1508 represent the executable instructions of the software architecture 1502, including implementation of the methods, modules and so forth of FIGS. 1-9. Hardware layer 1504 also includes memory or storage modules 1510, which also have executable instructions 1508. Hardware layer 1504 may also comprise other hardware as indicated by 1512 which represents any other hardware of the hardware layer 1504, such as the other hardware illustrated as part of machine 1600.

In the example architecture of FIG. 10, the software 1502 may be conceptualized as a stack of layers where each layer provides particular functionality. For example, the software 1502 may include layers such as an operating system 1514, libraries 1516, frameworks/middleware 1518, applications 1520 and presentation layer 1544. Operationally, the applications 1520 or other components within the layers may invoke application programming interface (API) calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi@ drivers, audio drivers, power management drivers, and so forth depending on the hardware configuration.

The libraries 1516 may provide a common infrastructure that may be utilized by the applications 1520 or other components or layers. The libraries 1516 typically provide functionality that allows other software modules to perform tasks in an easier fashion than to interface directly with the underlying operating system 1514 functionality (e.g., kernel 1528, services 1530 or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 or other software components/modules, some of which may be specific to a particular operating system or platform.

The applications 1520 includes built-in applications 1540 or third party applications 1542. Examples of representative built-in applications 1540 may include, but are not limited to, a contacts application, a browser application, a book reader application, a location application, a media application, a messaging application, a VR engine 1401, or a game application. Third party applications 1542 may include any of the built in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530 or drivers 1532), libraries (e.g., system 1534, APIs 1536, and other libraries 1538), frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 10, this is illustrated by virtual machine 1548. A virtual machine creates a software environment where applications/modules can execute as if they were executing on a hardware machine (such as the machine of FIG. 8, for example). A virtual machine is hosted by a host operating system (operating system 1514 in FIG. 10) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 or presentation layer 1558. These layers of software architecture executing within the virtual machine 1548 can be the same as corresponding layers previously described or may be different.

In the example embodiment, the VR engine 1401 operates as an application in the applications 1520 layer. However, in some embodiments, the VR engine 1401 may operate in other software layers, or in multiple software layers (e.g., framework ISIS and application 1520), or in any architecture that enables the systems and methods as described herein. The VR engine 1401 may be similar to the VR engine 112.

Figure 11:
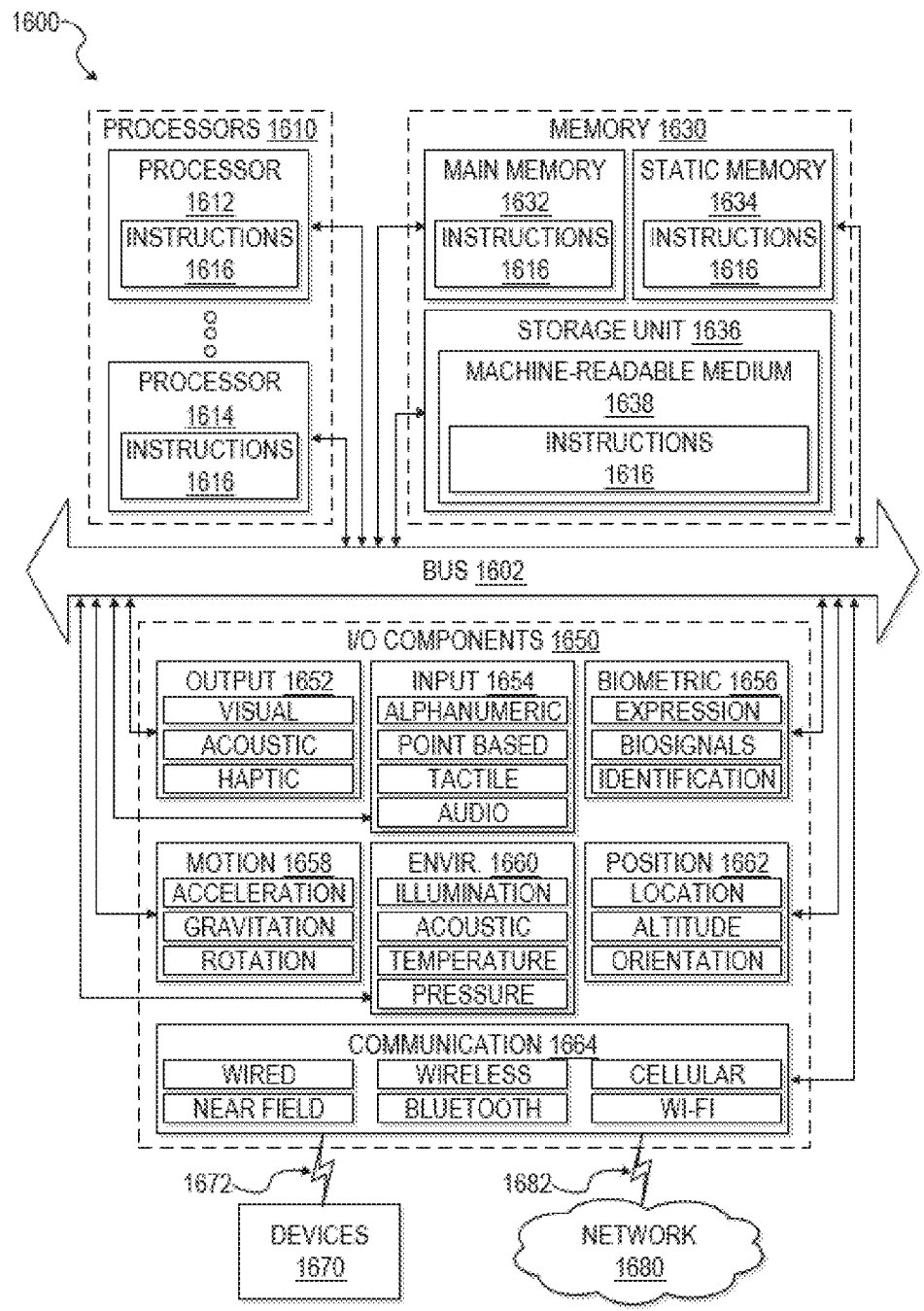
FIG. 11 is a block diagram illustrating components of a machine, according to some example embodiments, configured to read instructions from a machine-readable medium (e.g., a machine-readable storage medium) and perform any one or more of the operations or methodologies discussed herein.

FIG. 11 is a block diagram illustrating components of a machine 1600, according to some example embodiments, able to read instructions from a machine-readable medium 1638 (e.g., a machine-readable storage medium) and perform any one or more of the VR methodologies discussed herein. Specifically, FIG. 11 shows a diagrammatic representation of the machine 1600 in the example form of a computer system, within which instructions 1616 (e.g., software, a program, an application, an applet, an app, or other executable code) for causing the machine 1600 to perform any one or re of the methodologies discussed herein may be executed. For example the instructions may cause the machine to execute the flow diagrams of FIG. 3. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU) a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 11 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 11. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), position-sensing components, and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived) orientation sensor components (e.g., magnetometers), and the like.

Communication may be implemented using a wide variety of technologies. The I/components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories;
   a set of instructions incorporated into the one or more computer memories, the set of instructions configuring the one or more computer processors to perform operations for improving a displaying of a user interface element in a mixed reality device, the operations comprising:
   receiving a request to display the user interface element, the request including display instructions and a velocity threshold; and
   continuously performing display operations while continuously receiving sensor data from the mixed reality device, the display operations including,
   based on the sensor data indicating that a motion of the mixed reality user interface device has a velocity below the velocity threshold, displaying the user interface element according to the display instructions.

2. The system of claim 1, the display operations further including:
   based on a determination that a hand or a handheld device is in a view frustum of the mixed reality device, tracking a position and an orientation of the hand or handheld device over time; and
   anchoring the display of the user interface element to the position and the orientation of the hand or the handheld device according to the display instructions.

3. The system of claim 2, wherein a transitioning of displaying of the user interface element onto or off the hand or the handheld device includes displaying a morphing animation according to morphing instructions included in the display instructions.

4. The system of claim 3, wherein the displaying of the user interface element on the hand or handheld device includes wrapping the user interface element around the hand or handheld device based on instructions included in the display instructions.

5. The system of claim 1, wherein the display operations further include performing a spatial scrolling based on the sensor data indicating an initiation of a spatial scrolling event via a trigger, the spatial scrolling including the following operations:
   determining an initial position for a handheld device or a hand during the initiation of the spatial scrolling event;
   determining an initial direction for a motion of the handheld device or of the hand immediately after the initiation of the spatial scrolling event;
   determining a distance of movement of the handheld device or of the hand along the initial direction while the trigger is maintained; and
   highlighting an item from a plurality of items in the displayed user interface element based on a mapping of the distance of movement onto a positioning of the plurality of items within the user interface element.

6. The system of claim 5, wherein the trigger is initiated by one of the following: a push of a button on the handheld device, and a selection gesture performed by the hand.

7. The system of claim 5, wherein a highlighted item is selected based on an ending of the trigger event.

8. A method comprising:
   performing operations for improving a display of a user interface element in a mixed reality environment, the operations comprising:
   receiving a request to display the user interface element, the request including display instructions, angle threshold data, distance threshold data and a velocity threshold; and
   continuously performing display operations while continuously receiving sensor data from a mixed reality user interface device, the display operations including, based on the sensor data indicating that a motion of the mixed reality user interface device is below the velocity threshold, displaying the user interface element according to the display instructions.

9. The method of claim 8, the display operations further including:
   based on a determination that a hand or a handheld device is in a view frustum of the mixed reality device, tracking a position and an orientation of the hand or handheld device over time; and
   anchoring the display of the user interface element to the position and the orientation of the hand or the handheld device according to the display instructions.

10. The method of claim 9, wherein a transitioning of displaying of the user interface element onto or off the hand or the handheld device includes displaying a morphing animation according to morphing instructions included in the display instructions.

11. The method of claim 10, wherein the displaying of the user interface element on the hand or handheld device includes wrapping the user interface element around the hand or handheld device based on instructions included in the display instructions.

12. The method of claim 8, wherein the display operations further include performing a spatial scrolling based on the sensor data indicating an initiation of a spatial scrolling event via a trigger, the spatial scrolling including the following operations:
   determining an initial position for a handheld device or a hand during the initiation of the spatial scrolling event;
   determining an initial direction for a motion of the handheld device or of the hand immediately after the initiation of the spatial scrolling event;
   determining a distance of movement of the handheld device or of the hand along the initial direction while the trigger is maintained; and
   highlighting an item from a plurality of items in the displayed user interface element based on a mapping of the distance of movement onto a positioning of the plurality of items within the user interface element.

13. The method of claim 12, wherein the trigger is initiated by one of the following: a push of a button on the handheld device, and a selection gesture performed by the hand.

14. A non-transitory machine-readable medium storing processor-executable instructions which, when executed by a processor, cause the processor to perform operations for improving a display of a user interface element in a mixed reality environment, the operations comprising:
   receiving a request to display the user interface element, the request including display instructions, angle threshold data, distance threshold data, and velocity threshold data;
   continuously performing display operations while continuously receiving sensor data from a mixed reality user interface device, the display operations including, based on the sensor data indicating that a motion of the mixed reality user interface device is below the velocity threshold, displaying the user interface element according to the display instructions.

15. The non-transitory machine-readable medium of claim 14, the display operations further including:
   based on a determination that a hand or a handheld device is in a view frustum of the mixed reality device, tracking a position and an orientation of the hand or handheld device over time; and
   anchoring the display of the user interface element to the position and the orientation of the hand or the handheld device according to the display instructions.

16. The non-transitory machine-readable medium of claim 15, wherein a transitioning of displaying of the user interface element onto or off the hand or the handheld device includes displaying a morphing animation according to morphing instructions included in the display instructions.

17. The non-transitory machine-readable medium of claim 16, wherein the displaying of the user interface element on the hand or handheld device includes wrapping the user interface element around the hand or handheld device based on instructions included in the display instructions.

18. The non-transitory machine-readable medium of claim 14, wherein the display operations further include performing a spatial scrolling based on the sensor data indicating an initiation of a spatial scrolling event via a trigger, the spatial scrolling including the following operations:
   determining an initial position for a handheld device or a hand during the initiation of the spatial scrolling event;
   determining an initial direction for a motion of the handheld device or of the hand immediately after the initiation of the spatial scrolling event;
   determining a distance of movement of the handheld device or of the hand along the initial direction while the trigger is maintained; and
   highlighting an item from a plurality of items in the displayed user interface element based on a mapping of the distance of movement onto a positioning of the plurality of items within the user interface element.

19. The non-transitory machine-readable medium of claim 14 wherein the trigger is initiated by one of the following: a push of a button on the handheld device, and a selection gesture performed by the hand.

20. The method of claim 19, wherein a highlighted item is selected based on an ending of the trigger event.

\* \* \* \* \*

UNITED STATES PATENT AND TRADEMARK OFFICE
CERTIFICATE OF CORRECTION

PATENT NO. : 11,068,067 B2
APPLICATION NO. : 16/709373
DATED : July 20, 2021
INVENTOR(S) : West et al.

It is certified that error appears in the above-identified patent and that said Letters Patent is hereby corrected as shown below:

In the Claims

In Column 23, Line 3, in Claim 20, delete "method" and insert --non-transitory machine-readable medium-- therefor Signed and Sealed this
Nineteenth Day of October, 2021

Drew Hirshfeld
*Performing the Functions and Duties of the
Under Secretary of Commerce for Intellectual Property and
Director of the United States Patent and Trademark Office*